United States Patent
Wang et al.

(10) Patent No.: US 11,204,952 B2
(45) Date of Patent: Dec. 21, 2021

(54) DETECTING ANOMALIES IN BEHAVIORAL NETWORK WITH CONTEXTUAL SIDE INFORMATION

(71) Applicant: Microsoft Technology Licensing, LLC, Redmond, WA (US)

(72) Inventors: Xiang Wang, Davis, CA (US); Bo Thiesson, Woodinville, WA (US); Jack Wilson Stokes, III, North Bend, WA (US); Edward Wilkins Hardy, Seattle, WA (US); Jonathan Andreas Espenschied, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 615 days.

(21) Appl. No.: 15/487,094

(22) Filed: Apr. 13, 2017

(65) Prior Publication Data
US 2017/0286533 A1  Oct. 5, 2017

Related U.S. Application Data

(63) Continuation of application No. 13/730,078, filed on Dec. 28, 2012, now Pat. No. 9,659,085.

(51) Int. Cl.
*G06F 16/335* (2019.01)
(52) U.S. Cl.
CPC ................... *G06F 16/335* (2019.01)
(58) Field of Classification Search
None
See application file for complete search history.

(56) References Cited

U.S. PATENT DOCUMENTS

| | | | |
|---|---|---|---|
| 7,114,183 B1 * | 9/2006 | Joiner | H04L 43/045 713/188 |
| 7,690,037 B1 | 3/2010 | Hartmann | |

(Continued)

OTHER PUBLICATIONS

Mathew et al. "Insider Abuse Comprehension Through Capability Acquisition Graphs". 2008 11th Int'l Conference on Information Fusion, pp. 1-8. Jun.-Jul. 2008. URL Link: <https://ieeexplore.ieee.org/document/4632279>. Accessed May 2020. (Year: 2008).*

Mostefaoui et al. "Modeling context-based security policies with contextual graphs". IEEE Annual Conf on Pervasive Computing & Comm Workshops. Mar. 2004. DOI: 10.1109/percomw.2004.1276900. URL Link: <https://ieeexplore.ieee.org/document/1276900>. Accessed May 2020. (Year: 2004).*

(Continued)

*Primary Examiner* — Irene Baker
(74) *Attorney, Agent, or Firm* — Medley, Behrens & Lewis, LLC

(57) ABSTRACT

Various technologies described herein pertain to detecting contextual anomalies in a behavioral network. Label propagation can be performed to construct contexts and assign respective context membership scores to users. Each context can be a respective subset of the users expected to have similar resource usages. The contexts can be constructed and the context membership scores can be assigned by combining behavioral information and contextual side information. The behavioral information can specify respective resource usages by the users within the behavioral network. Moreover, respective contextual anomaly scores for the users can be computed based on the respective context membership scores assigned to the users and the contextual side information. Further, the contextual anomalies can be detected from the contextual anomaly scores.

20 Claims, 9 Drawing Sheets

(56) References Cited

U.S. PATENT DOCUMENTS

| | | | |
|---|---|---|---|
| 7,797,421 | B1 | 9/2010 | Scofield et al. |
| 8,165,414 | B1* | 4/2012 | Yagnik .................... G06F 16/41 |
| | | | 382/255 |
| 8,201,257 | B1* | 6/2012 | Andres ................. G06F 21/568 |
| | | | 726/23 |
| 2003/0187725 | A1 | 10/2003 | Jotkowitz |
| 2004/0143749 | A1* | 7/2004 | Tajalli ................... G06F 21/316 |
| | | | 726/23 |
| 2005/0222820 | A1* | 10/2005 | Chung ............ G08B 13/19645 |
| | | | 702/188 |
| 2006/0155751 | A1 | 7/2006 | Geshwind et al. |
| 2006/0236408 | A1* | 10/2006 | Yan ..................... G06F 21/6218 |
| | | | 726/29 |
| 2007/0180491 | A1* | 8/2007 | Mevissen ................ H04L 63/10 |
| | | | 726/2 |
| 2007/0209074 | A1* | 9/2007 | Coffman ............... H04L 63/145 |
| | | | 726/23 |
| 2007/0214144 | A1 | 9/2007 | Lawson et al. |
| 2007/0245420 | A1 | 10/2007 | Yong et al. |
| 2008/0027891 | A1* | 1/2008 | Repasi .................... G06F 21/55 |
| | | | 706/52 |
| 2008/0104046 | A1* | 5/2008 | Singla ..................... H04L 63/20 |
| 2008/0148398 | A1* | 6/2008 | Mezack .................. G06F 21/55 |
| | | | 726/22 |
| 2008/0189232 | A1 | 8/2008 | Dunning et al. |
| 2008/0271143 | A1 | 10/2008 | Stephens et al. |
| 2009/0293121 | A1* | 11/2009 | Bigus .................... G06F 21/316 |
| | | | 726/22 |
| 2010/0306179 | A1 | 12/2010 | Lim |
| 2011/0197275 | A1 | 8/2011 | Chasin et al. |
| 2011/0225650 | A1* | 9/2011 | Margolies ............. G06F 21/554 |
| | | | 726/22 |
| 2011/0252032 | A1* | 10/2011 | Fitzgerald ............... H04L 63/20 |
| | | | 707/737 |
| 2012/0096549 | A1 | 4/2012 | Amini et al. |
| 2012/0137367 | A1* | 5/2012 | Dupont .................... G06F 21/00 |
| | | | 726/25 |
| 2012/0151270 | A1 | 6/2012 | Stolfo et al. |
| 2012/0233698 | A1* | 9/2012 | Watters ................. G06F 21/554 |
| | | | 726/25 |
| 2012/0246093 | A1 | 9/2012 | Stibel et al. |
| 2012/0254094 | A1 | 10/2012 | Flinn et al. |
| 2012/0278021 | A1 | 11/2012 | Lin et al. |
| 2012/0294511 | A1 | 11/2012 | Datta et al. |
| 2013/0055367 | A1* | 2/2013 | Kshirsagar .............. G06F 21/32 |
| | | | 726/6 |
| 2013/0167207 | A1* | 6/2013 | Davis .................... G06F 21/316 |
| | | | 726/5 |
| 2013/0303154 | A1* | 11/2013 | Gupta ................. H04W 12/128 |
| | | | 455/423 |
| 2013/0305357 | A1* | 11/2013 | Ayyagari .................. G06F 9/00 |
| | | | 726/22 |
| 2013/0310078 | A1 | 11/2013 | Raman et al. |
| 2014/0100835 | A1* | 4/2014 | Majumdar ................ G06N 3/00 |
| | | | 703/11 |
| 2014/0188895 | A1 | 7/2014 | Wang et al. |

OTHER PUBLICATIONS

Xiang, et al., "Video Behaviour Profiling for Anomaly Detection", Retrieved at <<http://www.eecs.qmul.ac.uk/~txiang/publications/xiang_gong_behaviour_PAMI_final_proof.pdf>>, IEEE Transactions on Pattern Analysis and Machine Intelligence (PAMI), May 2008, pp. 1-35.

Koutra, et al., "TENSORSPLAT: Spotting Latent Anomalies in Time", Retrieved at <<http://www.cs.cmu.edu/~epapalex/papers/PCI2012.pdf>>, Retrieved Date: Nov. 30, 2012, pp. 1-6.

Noble, et al., "Graph-Based Anomaly Detection", Retrieved at <<http://ailab.wsu.edu/subdue/papers/NobleKDD03.pdf>>, SIGKDD Conference on Knowledge Discovery and Data Mining, Aug. 24, 2003, pp. 1-7.

Chandola, et al., "Anomaly Detection: A Survey", Retrieved at <<http://www-users.cs.umn.edu/~banerjee/papers/09/anomaly.pdf>>, In Journal of ACM Computing Surveys, vol. 41, Issue 3, Jul. 2009, pp. 1-58.

Gao, et al., "On Community Outliers and their Efficient Detection in Information Networks", Retrieved at <<http://www.cs.uiuc.edu/~hanj/pdf/kdd10_jgao.pdf>>. In Proceedings of the 16th ACM SIGKDD International Conference on Knowledge Discovery and Data Mining, Jul. 25, 2010, pp. 1-10.

Sun, et al., "Neighborhood Formation and Anomaly Detection in Bipartite Graphs", Retrieved at <<http://ieeexplore.ieee.org/stamp/stamp.jsp?tp=&arnumber=1565707>>, In Fifth IEEE International Conference on Data Mining, Nov. 27, 2005, pp. 1-8.

Wang, et al., "Discovering Contexts and Contextual Outliers Using Random Walks in Graphs", Retrieved at <<https://i2cs.cs.uiuc.edu/download/attachments/12357/Discovering+Contexts+and+Contextual+Outliers+Using+Random+Walks+in+Graphs,+ICDM'09.pdf>>, In Proceedings of the Ninth IEEE International Conference on Data Mining, Dec. 6, 2009, pp. 1-6.

"International Search Report (ISR) and Written Opinion for PCT Patent Application No. PCT/US2013/077739", dated Jan. 19, 2015, 11 pages.

"Non-Final Office Action for U.S. Appl. No. 13/730,078", dated Oct. 29, 2014, 11 pages.

"Response to the Office Action for U.S. Appl. No. 13/730,078", Filed Date: Mar. 25, 2015, 16 pages.

"Final Office Action for U.S. Appl. No. 13/730,078", dated Apr. 6, 2015, 18 pages.

"Non-Final Office Action for U.S. Appl. No. 13/730,078", dated Jul. 21, 2015, 18 pages.

"Response to the Non-Final Office Action for U.S. Appl. No. 13/730,078", Filed Date: Jan. 21, 2016, 22 pages.

"Final Office Action for U.S. Appl. No. 13/730,078", dated Jul. 8, 2016, 23 pages.

"Response to the Final Office Action for U.S. Appl. No. 13/730,078", Filed Date: Dec. 8, 2016, 15 pages.

"Notice of Allowance and Fees Due for U.S. Appl. No. 13/730,078", dated Feb. 13, 2017, 16 pages.

* cited by examiner

DETECTING ANOMALIES IN BEHAVIORAL NETWORK WITH CONTEXTUAL SIDE INFORMATION

CROSS-REFERENCE TO RELATED APPLICATIONS

This application is a continuation of U.S. patent application Ser. No. 13/730,078, filed on Dec. 28, 2012, and entitled "DETECTING ANOMALIES IN BEHAVIORAL NETWORK WITH CONTEXTUAL SIDE INFORMATION", the entirety of which is incorporated herein by reference.

BACKGROUND

Many conventional anomaly detection techniques attempt to detect global anomalies. Global anomalies, also referred to as point anomalies, are data objects that deviate from normal behavior of an entire dataset. For example, a global anomaly in a social network may be an inactive account with few contacts or friends. According to another example, a global anomaly in an academic collaboration network may be an infrequent contributor with few collaborators. However, global anomalies may not be particularly useful or relevant for some applications.

Other conventional techniques attempt to detect contextual anomalies. A contextual anomaly is a data object that is anomalous with respect to a specific context, but may seem normal when in a different context. Contextual anomalies may be interesting if the corresponding context has practical implications. For example, a contextual anomaly in a security network can imply unauthorized access or identity theft if the contexts are different organizational groups. According to another example, a contextual anomaly in an academic collaboration network can indicate cross-disciplinary research when the contexts are different research areas.

Some approaches for detecting contextual anomalies treat context formation and anomaly detection as separate steps. Thus, contexts are defined using contextual attributes. After defining the contexts, then contextual anomalies can be defined as global anomalies (e.g., point anomalies) for each specific context. Other approaches for detecting contextual anomalies model a structure in the data and then detect contextual anomalies based on such model.

SUMMARY

Described herein are various technologies that pertain to detecting contextual anomalies in a behavioral network. Label propagation can be performed to construct contexts and assign respective context membership scores to users. Each context can be a respective subset of the users expected to have similar resource usages. The contexts can be constructed and the context membership scores can be assigned by combining behavioral information and contextual side information. The behavioral information can specify respective resource usages by the users within the behavioral network. Moreover, respective contextual anomaly scores for the users can be computed based on the respective context membership scores assigned to the users and the contextual side information. Further, the contextual anomalies can be detected from the contextual anomaly scores.

In accordance with various embodiments, user-by-resource activity data can be generated based on the behavioral information. The user-by-resource activity data can specify interactions between the users and a set of resources. Moreover, user-by-user affinity data can be generated based on the user-by-resource activity data. The user-by-user affinity data can specify similarities between the respective resource usages of the users. Further, user-by-user constraint data can be generated based on the contextual side information. The contexts can be constructed and the respective context membership scores can be assigned to the users (e.g., when performing the label propagation) based on the user-by-user affinity data and the user-by-user constraint data.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
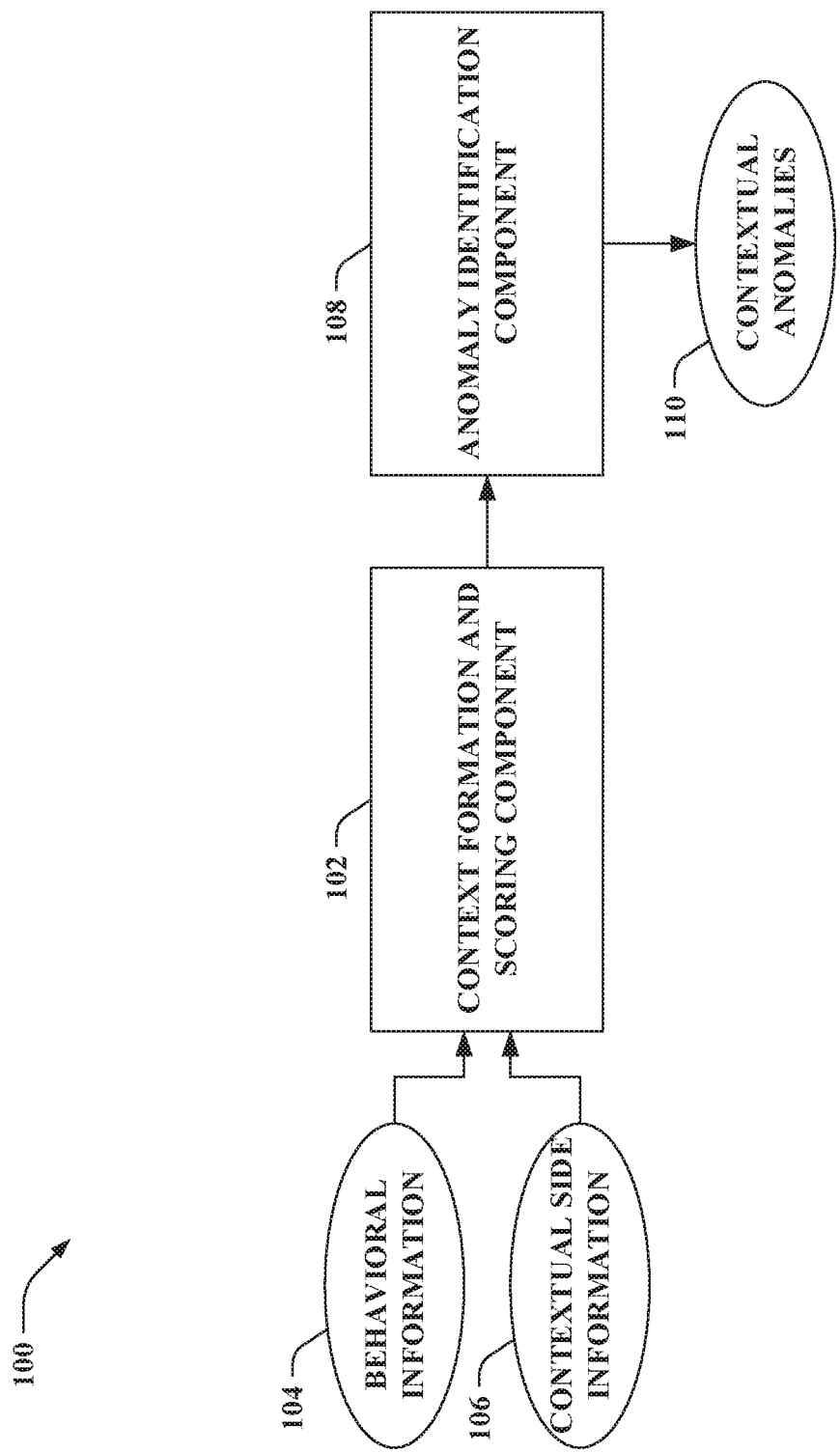
FIG. 1 illustrates a functional block diagram of an exemplary system that detects contextual anomalies in a behavioral network.

Various technologies pertaining to detecting contextual anomalies are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, contextual anomaly detection techniques can model a structure in data and detect contextual anomalies based on such models. Accordingly, an edge structure of a graph (e.g., representative of behavior information) and contextual side information pertaining to nodes in the graph can be used to define contexts and assign context membership scores to the nodes. Once the contexts are defined, each node can receive a contextual anomaly score with respect to the context to which it belongs. A contextual anomaly, also referred to as a contextual outlier, can be an object whose behavior deviates from a specific context. In other words, such object may be normal when put into a different context in a behavioral network.

Referring now to the drawings, FIG. 1 illustrates a system 100 that detects contextual anomalies 110 in a behavioral network. The system 100 includes a context formation and scoring component 102 that performs label propagation to construct contexts and assign respective context membership scores to users in a set of users. The context formation and scoring component 102 can combine behavioral information 104 for the set of users and contextual side information 106 during the label propagation. The behavioral information 104 specifies respective resource usages by the users within the behavioral network. Moreover, a context is a subset of the users expected to have similar resource usages.

Utilization of the contextual side information 106 can enhance the formation of the contexts and the assignment of the context membership scores as compared to conventional approaches that employ behavioral information without contextual side information. The contextual side information 106 can include user side information and/or resource side information. Examples of user side information include names of the users, locations of the users, groups to which the users belong, titles of the users, a combination thereof, and so forth. Examples of resource side information include device names, IP addresses, services, a combination thereof, and so forth. Further, it is contemplated that the contextual side information 106 can be from one or more sources (e.g., organizational charts, physical location, social network profiles, etc.). As compared to ground truth labels, the contextual side information 106 can be weaker, more abundant, and less expensive.

The system 100 further includes an anomaly identification component 108 that computes respective contextual anomaly scores for the users based on the respective context membership scores assigned to the users (e.g., by the context formation and scoring component 102) and the contextual side information 106. The anomaly identification component 108 can compute the contextual anomaly score for a given user as a function of a deviation between the contextual membership score assigned to the given user and an expected contextual membership score for the given user. The expected contextual membership score for the given user can be based on the contextual side information 106 and the respective contextual membership scores assigned to other users in the set of users.

Further, the contextual anomalies 110 can be detected from the contextual anomaly scores. For example, the anomaly identification component 108 can generate a ranked list of the contextual anomaly scores (e.g., a likely contextual anomaly can be at the top of the ranked list). Following this example, the contextual anomalies 110 can correspond to a top preset number of the contextual anomaly scores in the ranked list or the contextual anomaly score(s) in the ranked list above a threshold score.

According to an example, the contextual anomalies can be identified as network security threats in the behavioral network. Thus, by way of illustration, the behavioral information 104 can specify machines to which the users respectively connect. Further following this illustration, the contextual side information 106 can include user location information. It is to be appreciated, however, that the claimed subject matter is not limited to the foregoing.

As noted above, the context formation and scoring component 102 can perform label propagation. As part of label propagation, the context formation and scoring component 102 can initialize labels of the users. Moreover, the context formation and scoring component 102 can propagate the labels of the users to respective neighbors of each of the users based on the contextual side information 106. The context formation and scoring component 102 can further propagate the labels of the user based on the behavioral information 104 until convergence; such propagation of the labels based on the behavioral information 104 is subsequent to the propagation of the labels based on the contextual side information 106. The labels of the users after convergence are the respective context membership scores assigned to the users.

According to an example, it is contemplated that the propagation of the labels of the users to the respective neighbors of each of the users based on the contextual side information 106 can be repeated prior to propagation of the labels of the users based on the behavioral information 104. Such propagation based on the contextual side information 106 can be repeated two or more times. By way of illustration, propagation based on the contextual side information 106 can be repeated to convergence. However, it is to be appreciated that the claimed subject matter is not limited to the foregoing examples.

The behavioral network can be a time-evolving heterogeneous network. Thus, the network can have heterogeneous attributes and time-evolving behaviors. For instance, a network may provide rich information (e.g., richer than a network graph that includes a set of nodes and edge structure). By way of illustration, a corporate security network can include nodes that are each associated with a user. In addition to the user's behavior (e.g., the behavioral information 104), which is encoded by the edges incident to that node, there can be various attributes on that node, such as physical position, job title, group affiliation, and so on (e.g., the contextual side information 106). These heterogeneous attributes provide the contextual side information 106, which can be utilized to assist finding more meaningful contexts and contextual information. Accordingly, the system 100 can combine the behavioral information 104 and the contextual side information 106 to facilitate the context formation and contextual anomaly detection.

Moreover, the network may be time-evolving (e.g., the behavioral information 104 can include time-evolving behaviors). Networks are oftentimes not static; for instance, users (e.g., nodes) can join and leave a network and the behaviors (e.g., edges) of the users can evolve over time. As a result, the definition of contexts and contextual anomalies typically should evolve accordingly. Many conventional approaches attempt to address this by performing anomaly detection algorithms on individual snapshots of the network. However, this may be unsatisfactory when evaluating the behavior of a node against normal behavior since oftentimes it is desirable to consider the network at a current state as well as historical information. In contrast, the techniques set forth herein support efficiently updating the contexts and the contextual anomalies 110 over time, while allowing for preserving at least a portion of the historic information.

Figure 2:
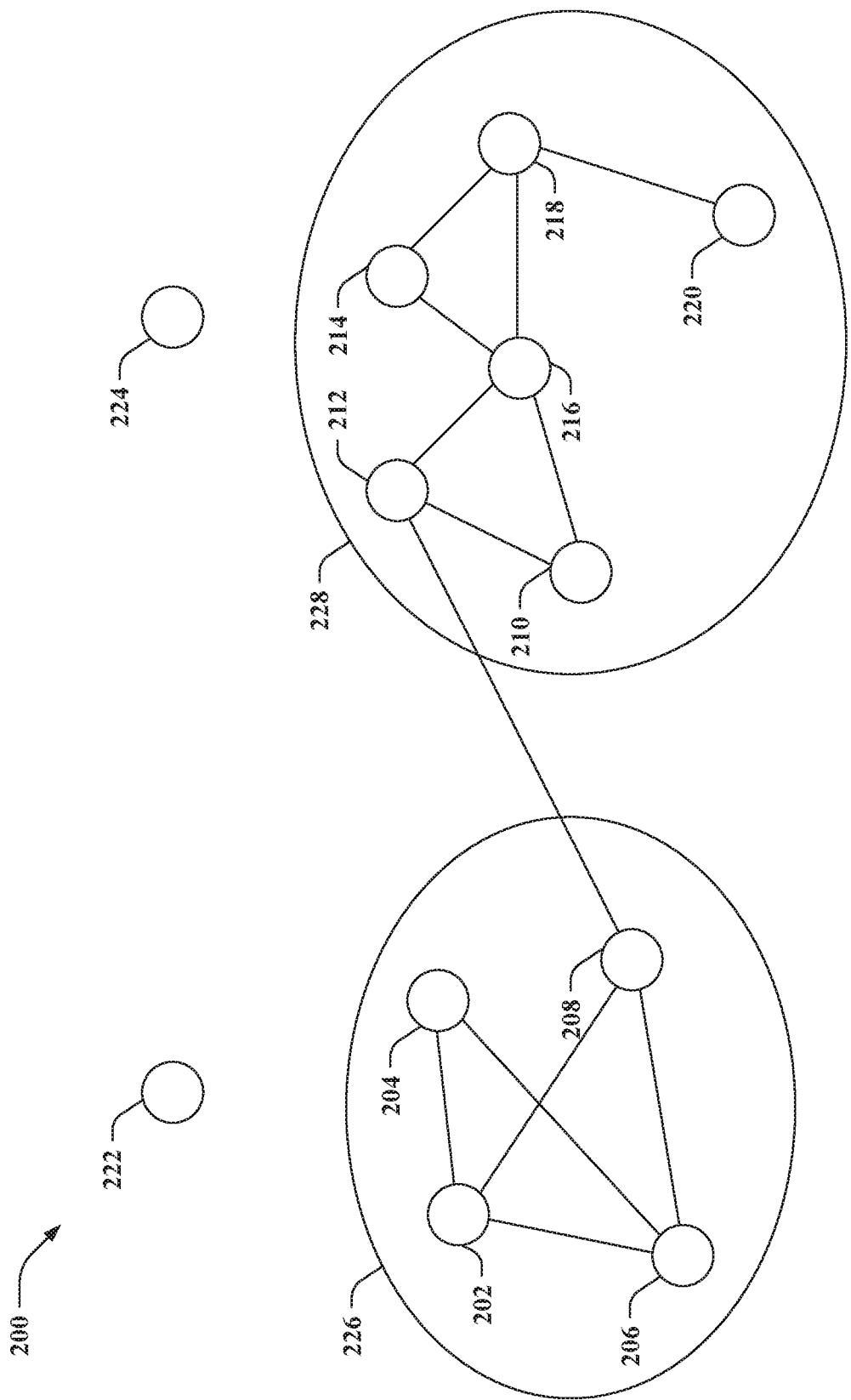
FIG. 2 illustrates an exemplary network that depicts global anomalies and contextual anomalies.

Now turning to FIG. 2, illustrated is an exemplary network 200 that depicts global anomalies and contextual anomalies. The network 200 includes a plurality of nodes 202-224. Edges between two of the nodes 202-224 represent users that utilize a common device (e.g., computer). As shown in FIG. 2, the node 222 and the node 224 are global anomalies (e.g., point anomalies) since there is no edge incident upon either the node 222 or the node 224 in the network 200; as such, the node 222 and the node 224 are outliers when considering the entire network 200.

Instead of detecting global anomalies, the techniques set forth herein can identify contextual anomalies. As illustrated in FIG. 2, the network 200 includes two dense groups, which are also referred to as to contexts 226-228. The context 226 includes a first subset of the nodes in the network 200 (e.g., the nodes 202-208). Further, the context 228 includes a second subset of the nodes in the network 200 (e.g., the nodes 210-220).

By way of an illustration, the context 226 can represent a subset of the users that are working on a top secret project, while the context 228 can represent a subset of the users that are third-party contractors. In the network 200, an edge is between the node 208 (in the context 226) and the node 212 (in the context 228). Accordingly, the user represented by the node 208 and the user represented by the node 212 are represented as having used the same computer (e.g., a third-party contractor used computer(s) typically used by developer(s) working on a top secret project in the above illustration). Thus, within the context 226, the node 208 can be a contextual outlier. Similarly, within the context 228, the node 212 can be a contextual outlier. However, if the node 212 was alternatively in the context 226 (not shown), then the behavior of the user represented by the node 212 may not be anomalous for the context 226. Likewise, if the node 208 was alternatively in the context 228 (not shown), then the behavior of the user represented by the node 208 may not be anomalous for the context 228.

Figure 3:
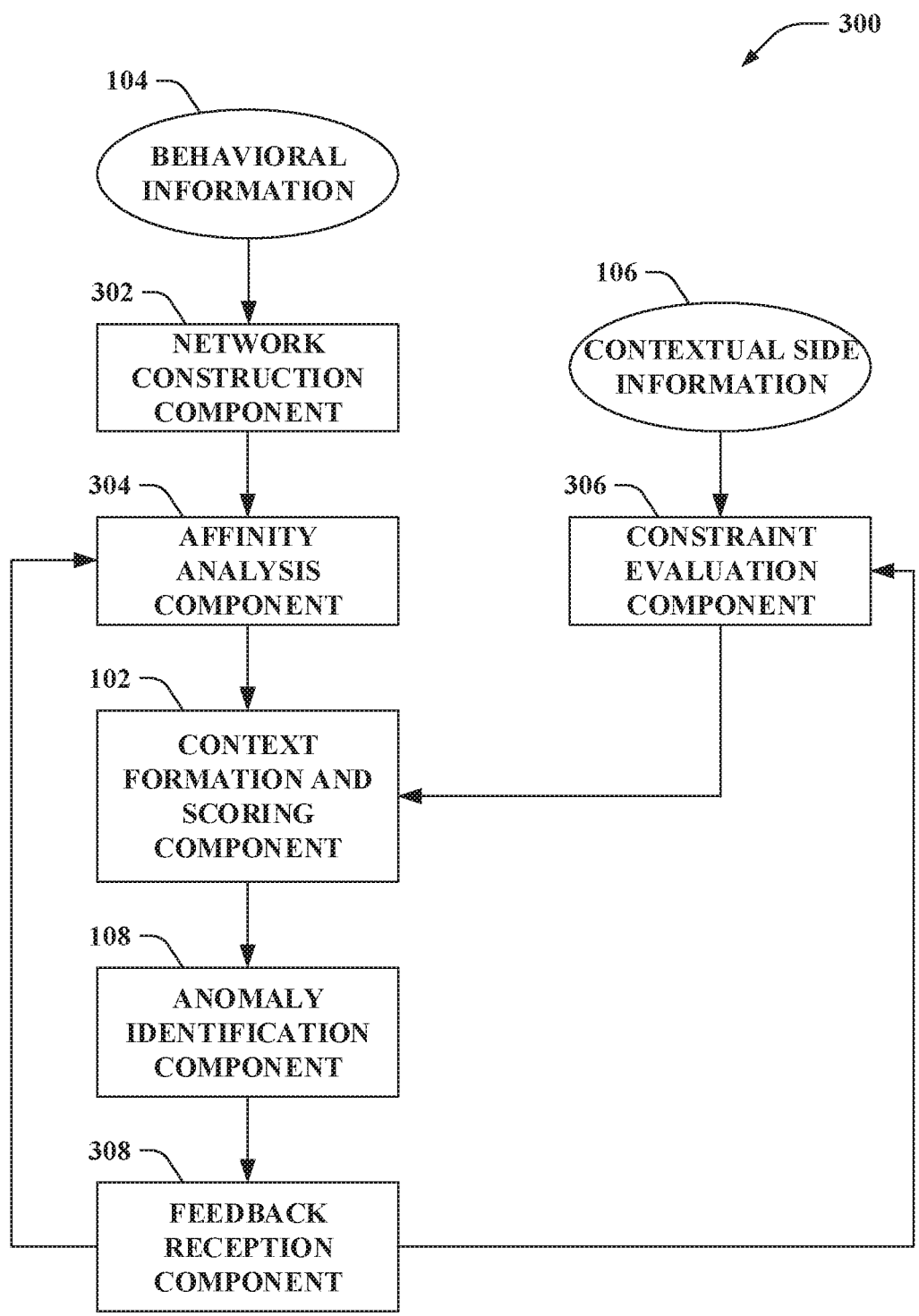
FIG. 3 illustrates a functional block diagram of an exemplary system that detects contextual anomalies in a behavioral network based on behavioral information and contextual side information.

With reference to FIG. 3, illustrated is a system 300 that detects contextual anomalies in a behavioral network based on the behavioral information 104 and the contextual side information 106. The system 300 includes a network construction component 302 that can receive the behavioral information 104 for the set of users. The behavioral information 104 specifies respective resource usages by the users within the behavioral network. For instance, the behavioral information 104 can be log files (e.g., raw log files, condensed log files, etc.); yet, the claimed subject matter is not so limited. According to an example (not shown), it is contemplated that raw log files can be processed (e.g., parsed) and filtered to remove some entries there within, thereby generating condensed log files. By way of another example, the log files can be from multiple networks (e.g., security logs, web logs, etc.).

The network construction component 302 can receive the behavioral information 104 (e.g., the log files). Further, the network construction component 302 can generate user-by-resource activity data based on the behavioral information 104. The user-by-resource activity data can specify interactions between the set of users and a set of resources. Examples of the user-by-resource activity data include a user-by-resource bipartite graph G, a user-by-resource activity matrix T, a combination thereof, and so forth.

The system 300 further includes an affinity analysis component 304 that generates user-by-user affinity data based on the user-by-resource activity data. The user-by-user affinity data can specify similarities between the respective resource usages of the users. Examples of the user-by-user affinity data include a user-by-user affinity graph, a user-by-user affinity matrix A, a combination thereof, and the like.

According to an example, the contextual side information 106 can include resource side information. Examples of resource side information include device names, IP addresses, services, a combination thereof, and so forth. Following such example, the affinity analysis component 304 can generate the user-by-user affinity data based on the user-by-resource activity data generated by the network construction component 302 and the resource side information. However, it is contemplated that the claimed subject matter is not limited to the foregoing example.

Moreover, the system 300 includes a constraint evaluation component 306 that can receive the contextual side information 106. The constraint evaluation component 306 can further generate user-by-user constraint data based on the contextual side information 106. According to various examples, the user-by-user constraint data can be a user-by-user constraint matrix Q, a user-by-user constraint graph, a combination thereof, and so forth.

The contextual side information 106 received by the constraint evaluation component 306 can include user side information. Moreover, the constraint evaluation component 306 can convert the user side information into pairwise constraints between users in the set of users (e.g., the user-by-user constraint data). Accordingly, the context formation and scoring component 102 can perform the label propagation based on the pairwise constraints between the users. Moreover, the anomaly identification component 108 can compute the respective contextual anomaly scores based on the pairwise constraints between the users.

In accordance with an example, it is contemplated that various types of information can be included in the contextual side information 106. Accordingly, the constraint evaluation component 306 can compute a first portion of the user-by-user constraint data that pertains to a first type of information in the contextual side information 106. Moreover, the constraint evaluation component 306 can compute a second portion of the user-by-user constraint data that pertains to a second type of information in the contextual side information, where the first type of information differs from the second of information. According to an illustration the first type of information can pertain to user location while the second type of information can pertain to a group with which the user is affiliated; however, the claimed subject matter is not limited to the foregoing illustration. The constraint evaluation component 306 can combine the first portion of the user-by-user constraint data and the second portion of the user-by-user constraint data (as well as any other portion(s) of the user-by-user constraint data) to form the user-by-user constraint data.

The user-by-user affinity data generated by the affinity analysis component 304 and the user-by-user constraint data generated by the constraint evaluation component 306 can be provided to the context formation and scoring component 102. Accordingly, the context formation and scoring component 102 can combine the user-by-user affinity data and the user-by-user constraint data during the label propagation to construct the contexts and assign the respective context membership scores to the users. Moreover, the anomaly identification component 108 can compute the respective contextual anomaly scores for the users based on the respective context membership scores assigned to users and the user-by-user constraint data. For instance, the anomaly identification component 108 can output a ranked list, wherein such ranking is based on the contextual anomaly scores.

The context formation and scoring component 102 can update the contexts as constructed and the context membership scores assigned to the users over time. For instance, the context formation and scoring component 102 can update the contexts and the context membership scores utilizing the label propagation based on time-evolving changes in the behavioral information 104, alterations to the contextual side information 106, feedback of an analyst, a combination thereof, and so forth. Further, the anomaly identification component 108 can update the respective contextual anomaly scores for the users over time (e.g., based upon the updated context membership scores, etc.).

The system 300 can further include a feedback reception component 308 that obtains feedback from an analyst responsive to the contextual anomalies detected based on the contextual anomaly scores generated by the anomaly identification component 108. According to an example, responsive to the feedback reception component 308 obtaining the feedback from the analyst, the affinity analysis component 304 can update the user-by-user affinity data based on such feedback; following this example, the feedback can be a revised graph, an explicit label (or labels), and so forth. Additionally or alternatively, responsive to the feedback reception component 308 obtaining the feedback from the analyst, the constraint evaluation component 306 can update the user-by-user constraint data based on the feedback; pursuant to this example, the feedback can be revised contextual side information.

In the system 300, the constraint evaluation component 306 can convert heterogeneous attributes into pairwise constraints. Moreover, the context formation and scoring component 102 can use the behavioral information 104 and the pairwise constraints to determine contexts. In accordance with an illustration, the behavioral information 104 can be defined by machine connections of users in a user-by-resource bipartite graph, and the pairwise constraints can be defined by physical locations of users in a network security application. In contrast to the approach set forth herein, utilization of the contextual side information 106 (e.g., the heterogeneous attributes on nodes) without the behavioral information 104 may be insufficient for defining contexts due to inconsistency or incompleteness of the contextual side information 106. Moreover, the behavioral information 104, if utilized without the contextual side information 106, may be insufficient due to noise and/or sparsity. Accordingly, the context formation and scoring component 102 can use label propagation to extract contexts and assign context membership scores by combining the behavioral information 104 and the contextual side information 106 during the label propagation. Further, the anomaly identification component 108 can compute a contextual anomaly score of a user based on a deviation of the context membership score of the user from its neighbors (e.g., a neighborhood structure can be defined by the pairwise constraints set forth by the contextual side information 106).

Figure 4:
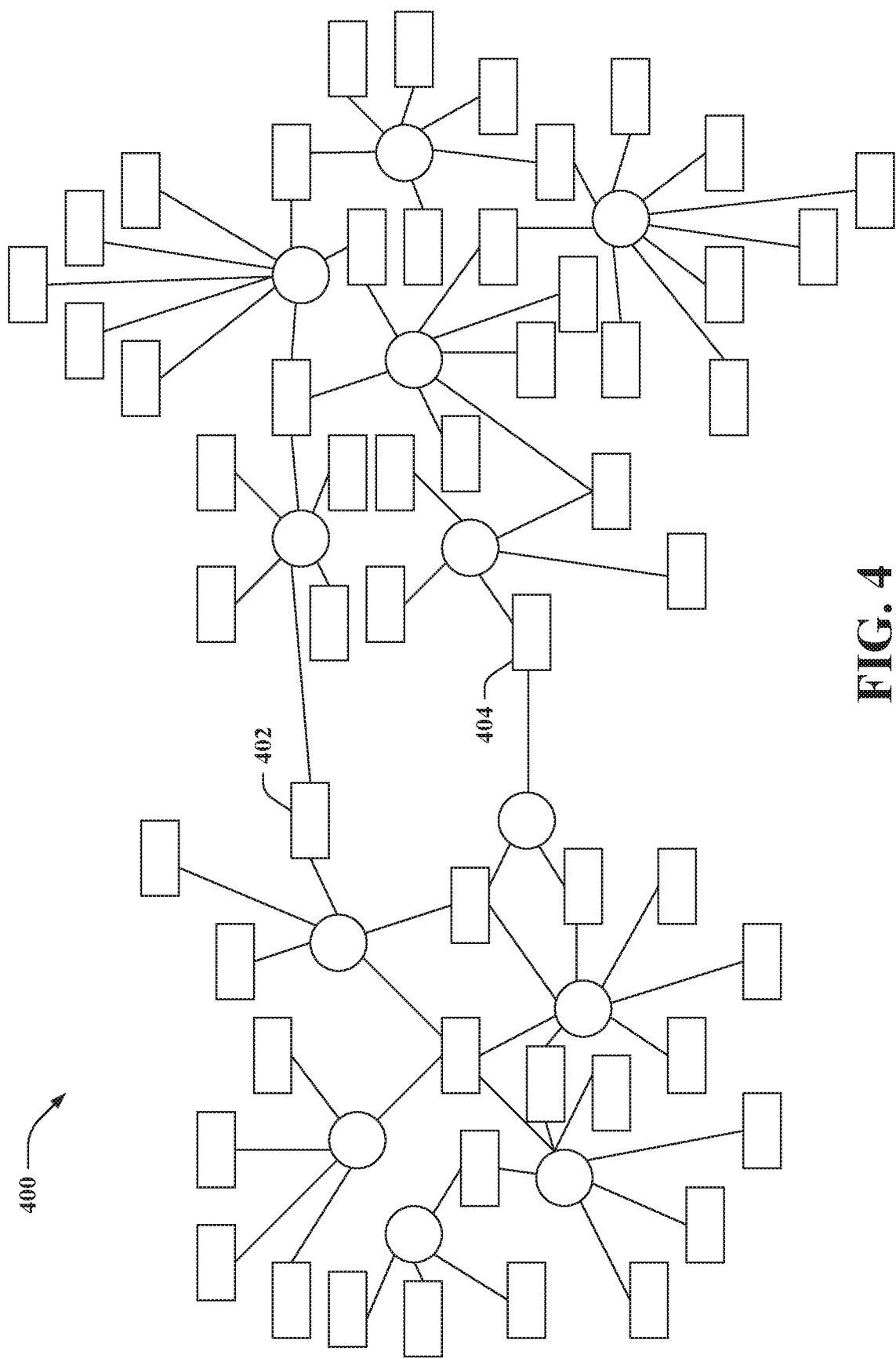
FIG. 4 illustrates an exemplary user-by-resource bipartite graph.

Turning to FIG. 4, illustrated is an exemplary user-by-resource bipartite graph 400 that can be generated by the network construction component 302. As shown in FIG. 4, squares can represent users and circles can represent computers. An edge between a user and a computer can represent use of the computer by the user.

The user-by-resource bipartite graph 400 as illustrated includes two contexts. Moreover, a user 402 and a user 404 can be contextual anomalies; however, the claimed subject matter is not limited to the example set forth in FIG. 4.

Figure 5:
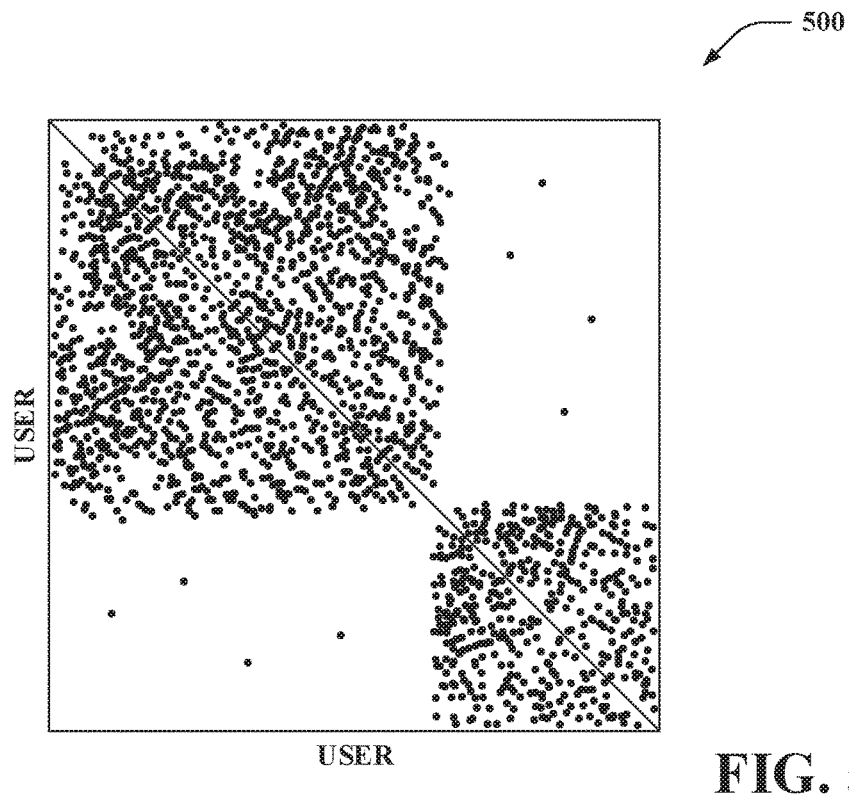
FIG. 5 illustrates an exemplary user-by-user affinity matrix.

Turning to FIG. 5, illustrated is an exemplary user-by-user affinity matrix 500 that can be generated by the affinity analysis component 304. Points in the user-by-user affinity matrix 500 represent two users that have high similarity. The user-by-user affinity matrix 500 can also be referred to as a user-by-user similarity matrix. Similarity can be defined based on behavioral information. For instance, such behavioral information can be an identity of computers that users share, how many computers they have shared, and so forth.

Figure 6:
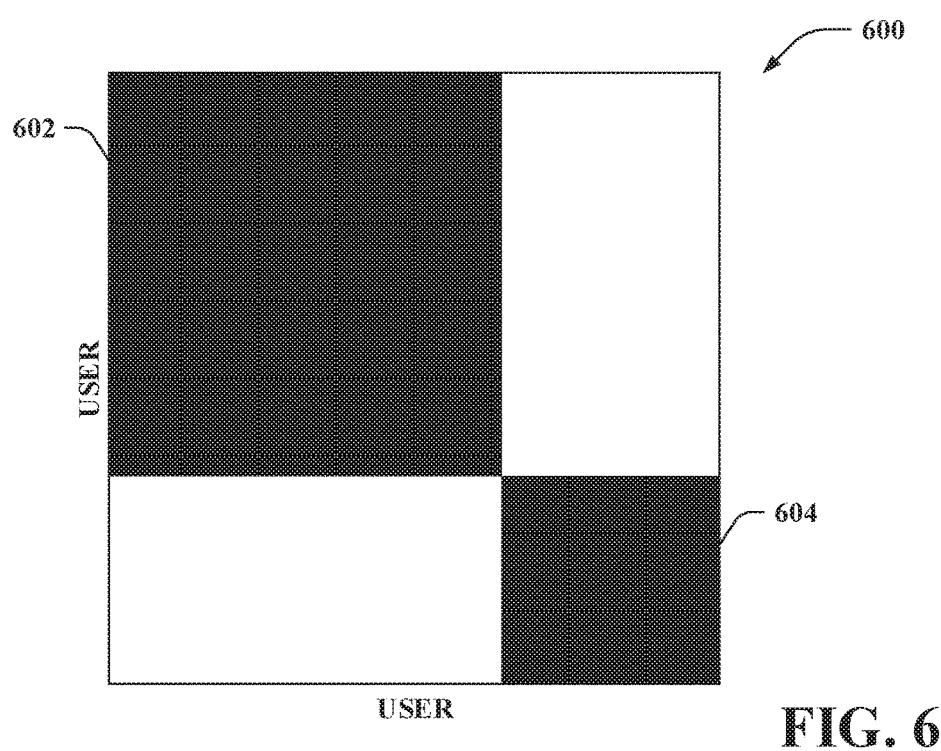
FIG. 6 illustrates an exemplary user-by-user constraint matrix.

With reference to FIG. 6, illustrated is an exemplary user-by-user constraint matrix 600 that can be generated by the constraint evaluation component 306. A region 602 of the user-by-user constraint matrix 600 represents users in a first group (e.g., users that belong to a first context), and a region 604 of the user-by-user constraint matrix 600 represents users in a second group (e.g., users that belong to a second context). The constraints can be defined based on contextual side information (e.g., user side information).

Figure 7:
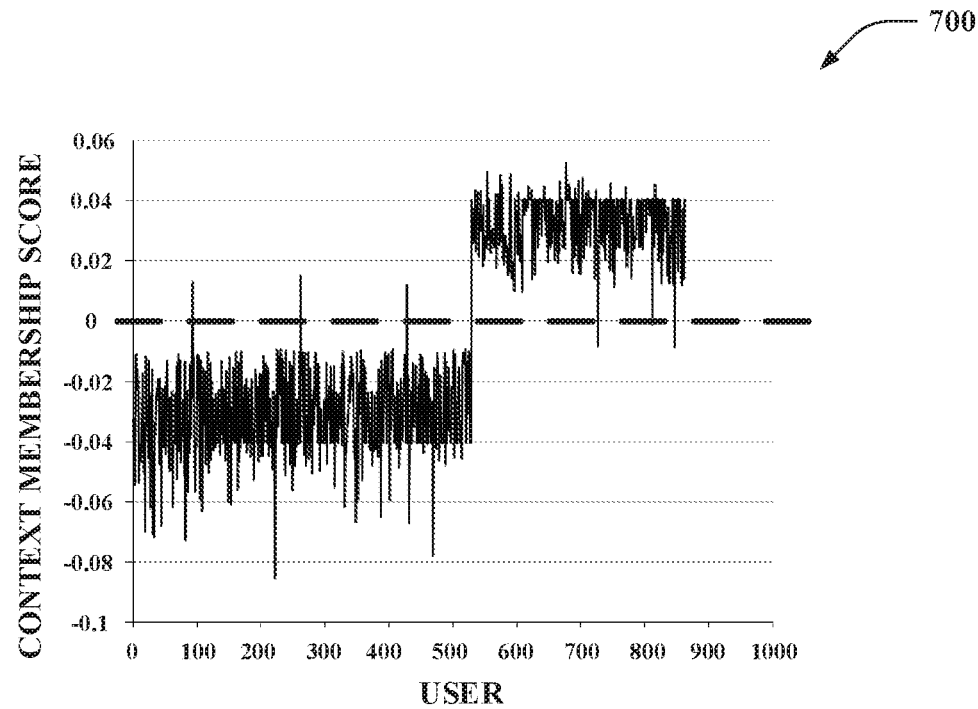
FIG. 7 illustrates an exemplary context membership score graph that depicts context membership scores for users.

Now turning to FIG. 7, illustrated is an exemplary context membership score graph 700 that depicts context membership scores for users. The context membership scores can be computed by the context formation and scoring component 102. As shown in the example of FIG. 7, the context membership score graph 700 illustrates two contexts. One of the contexts is below the dashed line and the other context is above the dashed line, where the dashed line is positioned at a context membership score of zero.

Figure 8:
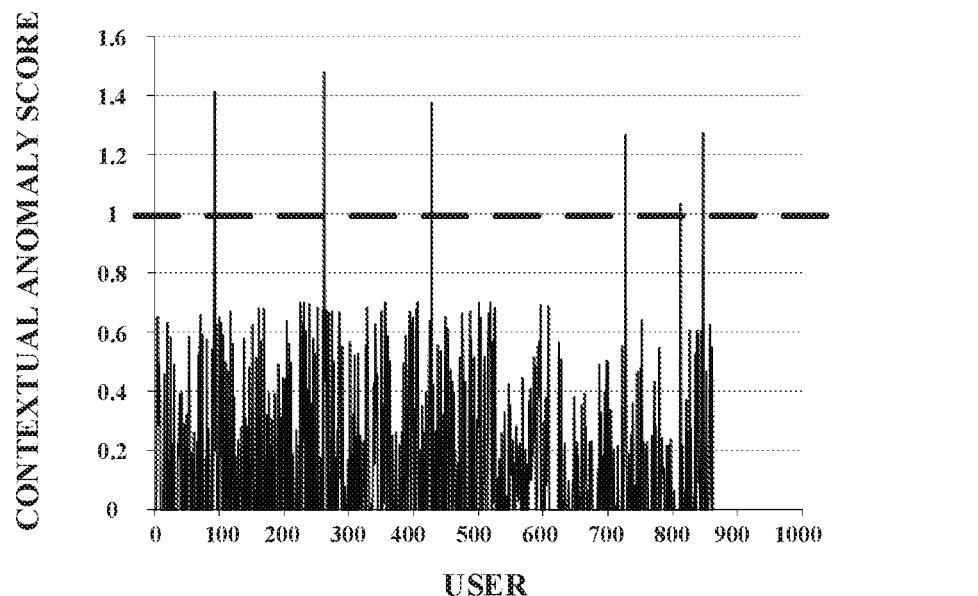
FIG. 8 illustrates an exemplary contextual anomaly score graph that depicts contextual anomalies for user.

With reference to FIG. 8, illustrated is an exemplary contextual anomaly score graph 800. The contextual anomaly scores can be computed by the anomaly identification component 108. The contextual anomaly scores above the dashed line in FIG. 8 correspond to detected contextual anomalies. As depicted, three users from the first context in the graph 700 of FIG. 7 have outlier scores, and three users from the second context from the graph 700 of FIG. 7 have outlier scores.

It is to be appreciated, however, that FIGS. 4-8 are provided for illustration purposes. Moreover, the claimed subject matter is not limited to the examples shown in FIGS. 4-8.

Again, reference is made to FIG. 3. The system 300 can be represented by the following notation. $U=\{u_1, \ldots, u_N\}$ is a set of users. $V=\{v_1, \ldots, v_M\}$ is a set of resources. $G=(U \cup V, U \times V)$ is a bipartite graph (e.g., generated by the network construction component 302) that encodes the interaction between the users and the resources. $T \in \mathbb{R}^{N \times M}$ is the corresponding transition matrix, which can be generated by the network construction component 302:

$$T(i,j)=Pr(u_i|v_j).$$

A context is a subset of users that are expected to have similar behaviors in terms of resource usage. Assume there are K different contexts. According to an example, each user can be described by an indicator vector $f \in \{0,1\}^K$, where $f(i)=1$ means the user belongs to context i, 0 otherwise.

Moreover, the user-by-user constraint matrix Q can be generated by the constraint evaluation component 306 based on the contextual side information 106. For instance, $Q \in \{0,+1\}^{N \times N}$ can encode the pairwise constraints associated with user contexts:

$$Q(i, j) = \begin{cases} +1 & u_i \text{ and } u_j \text{ belong to the same context,} \\ 0 & \text{otherwise.} \end{cases}$$

Alternatively, each Q(i, j) generated by the constraint evaluation component 306 can be a number between 0 and 1, where the magnitude of the value reflects a degree of belief as to if two users belong to the same context.

The contexts are collectively defined by user behaviors, encoded in T by the network construction component 302, and contextual side information, encoded in Q by the constraint evaluation component 306. Moreover, normal behaviors are collectively defined by users in a specific context. If a user action deviates from the normal behaviors of the context to which it belongs, then the user is an anomaly with respect to that specific context, referred to herein as a contextual anomaly.

The system 300 can identify the contextual anomalies as follows. The affinity analysis component 304 can use T to construct a user-by-user affinity matrix for users: $A \in \mathbb{R}^{N \times N}$. Moreover, the context formation and scoring component 102 can combine A and Q to form contexts $F \in \mathbb{R}^{N \times K}$. Further, the anomaly identification component 108 can find contextual anomalies in F.

More particularly, the affinity analysis component 304 can construct the user-by-user affinity matrix A based upon the user-by-resource activity matrix T:

$$T(i,j) = Pr(u_i | v_j).$$

Let A=TT'. A is naturally an affinity matrix for users. A can be interpreted as in various manners. According to an example, $A(i,j) \propto Pr(u_i, u_j)$:

$$A(i, j) = \sum_{k=1}^{M} T(i, k)T(j, k)$$

$$= \sum_{k=1}^{M} Pr(u_i | v_k) Pr(u_j | v_k)$$

$$= \sum_{k=1}^{M} Pr(u_i, u_j | v_k) \text{ (assume conditional independence)}$$

$$= M \sum_{k=1}^{M} Pr(u_i, u_j | v_k) Pr(v_k) \text{ (assume } Pr(v_k) \text{ is uniform)}$$

$$= M Pr(u_i, u_j)$$

In accordance with another example, A(i,j) can also be interpreted as the number of common neighbors (with normalization) of user i and j. That is, the cosine similarity. Thus, the foregoing provides a similarity measure between users that can be employed by the affinity analysis component 304. However, it is also contemplated that other similarities measures (e.g., Jaccard index or related similarity measures, etc.) can also be utilized by the affinity analysis component 304.

Further, the constraint evaluation component 306 can encode the contextual side information 106 on users to form the user-by-user constraint matrix Q. Q is an N×N constraint matrix for users:

$$Q(i, j) = \begin{cases} +1 & u_i \text{ and } u_j \text{ belong to the same context,} \\ 0 & \text{otherwise.} \end{cases}$$

In accordance with various examples, it is contemplated that the affinity analysis component 304 can encode side information on resources. Thus, R is an M×M constraint matrix for resources:

$$R(i, j) = \begin{cases} +1 & v_i \text{ and } v_j \text{ have the same functionality} \\ 0 & \text{otherwise.} \end{cases}$$

Hence, the user-by-user affinity matrix can be computed by the affinity analysis component 304 as follows:

$$A = TRT'.$$

Assume R=HH', then H can be considered as a projection from resource space to functionality space. Thus, it follows that:

$$A = (TH)(TH)'.$$

TH can be considered as a user-functionality feature matrix. After normalization, a random walk interpretation of A can hold.

Further, the context formation and scoring component 102 can perform label propagation. The context formation and scoring component 102 can normalize A and Q so that they are transition matrices, respectively referred to as $\overline{A}$ and $\overline{Q}$. Moreover, the context formation and scoring component 102 can implement the following label propagation process:

1. Assume that the users have an initial labeling to start with.
2. Cause the users to first propagate labels to their neighbors with the same context based on side information $\overline{Q}$.
3. Then cause the users to propagate labels among themselves based on the behavior graph $\overline{A}$ until convergence.

The propagation can be formalized as:

$$\begin{bmatrix} f^{(0)} \\ f^{(t+1)} \end{bmatrix} = \begin{bmatrix} I & 0 \\ \overline{Q} & \overline{A} \end{bmatrix} \begin{bmatrix} f^{(0)} \\ f^{(t)} \end{bmatrix}.$$

Thus, it follows that $f^{(t+1)} \propto \overline{A} f^{(t)} + \overline{Q} f^{(0)}$. Moreover, $f^{(t)}$ converges to $f^* \propto (I-\overline{A})^{-1} \overline{Q} f^{(0)}$. As set forth above, $f^{(0)}$ is an initial context indicator (labeling) and $f^*$ is the context indicator (labeling) after propagation (e.g., the context membership scores).

According to another example, it is contemplated that the context formation and scoring component 102 can alternatively repeat step 2 above when adding the contextual side information 106 into the label propagation. Hence, step 2 above can be repeated two or more times (e.g., k times where k is greater than 1) or to convergence. Thus, the context indicator (labeling) after propagation, if repeated k times, can be:

$$f^* \propto (I-\overline{A})^{-1} \overline{Q}^k f^{(0)}, k > 1.$$

Moreover, the context indicator (labeling) after propagation, if repeated to convergence, can be:

$$f^* \propto (I-\overline{A})^{-1} (I-Q)^{-1} f^{(0)}.$$

Moreover, the context formation and scoring component 102 can initialization the propagation by setting $f^{(0)}$ to the second largest eigenvector of $\overline{A}$, which can be the most significant stationary labeling under propagation when $\overline{Q}=I$:

$$f^{(0)} \propto (I-\overline{A})^{-1} f^{(0)}.$$

Further, the context formation and scoring component 102 can update the contexts and the context membership scores over time as follows. Assume the user behavior graph changes over time: $\overline{A}_s$: s=0, 1, . . . . Then, at time step s, the context indicator (labeling) can be:

$$f^*_s \propto (I-\overline{A}_s)^{-1} \overline{Q} f_s^{(0)}.$$

At time s+1, the context formation and scoring component 102 can use the converged labeling from time s to initialize the propagation. The propagation rule is:

$$\begin{bmatrix} f_s^* \\ f_{s+1}^{(t+1)} \end{bmatrix} = \begin{bmatrix} I & 0 \\ (1-\alpha)\overline{Q} & \alpha\overline{A}_{s+1} \end{bmatrix} \begin{bmatrix} f_s^* \\ f_{s+1}^{(t)} \end{bmatrix}$$

Here $\alpha$ is a decaying factor, where $\alpha \in (0,1)$. At each time step t, the chance of resetting $f_{s+1}^{(t)}$ to $f^*_s$ is $(1-\alpha)$.

The above propagation rule converges to:

$$f^*_{s+1} \propto (I-\alpha \overline{A}_{s+1})^{-1} \overline{Q} f^*_s.$$

Thus, updates evaluated by the context formation and scoring component 102 can have a substantially constant runtime. Further, such updating can employ an incremental computation over time with one pass of data. Note that when $\overline{A}_s$ does not change over time, $f^*_s$ converges to the generalized eigenvector of the matrix pencil $(\overline{A}_s, \overline{Q})$:

$$f^*_s \propto (I-\alpha \overline{A}_s)^{-1} \overline{Q} f^*_s.$$

Further, the anomaly identification component 108 can compute the contextual anomaly scores based on the context membership scores (e.g., the context indicator) and the contextual side information 106. For instance, the anomaly identification component 108 can compute the contextual anomaly score h(i) of user i by comparing the context membership score f*(i) of the user i to an expected contextual membership score f̂*(i) of the user i, where the expected contextual membership score is based on the contextual side information 106:

$$h(i) = \frac{|f^*(i) - \hat{f}^*(i)|}{|\hat{f}^*(i)|}, \hat{f}^*(i) = \frac{\sum_j Q(i,j) f^*(j)}{\sum_j |Q(i,j)|}$$

In other words, h(i) is the difference between the expected context membership score of user i and its actual context membership score with normalization.

Figure 9:
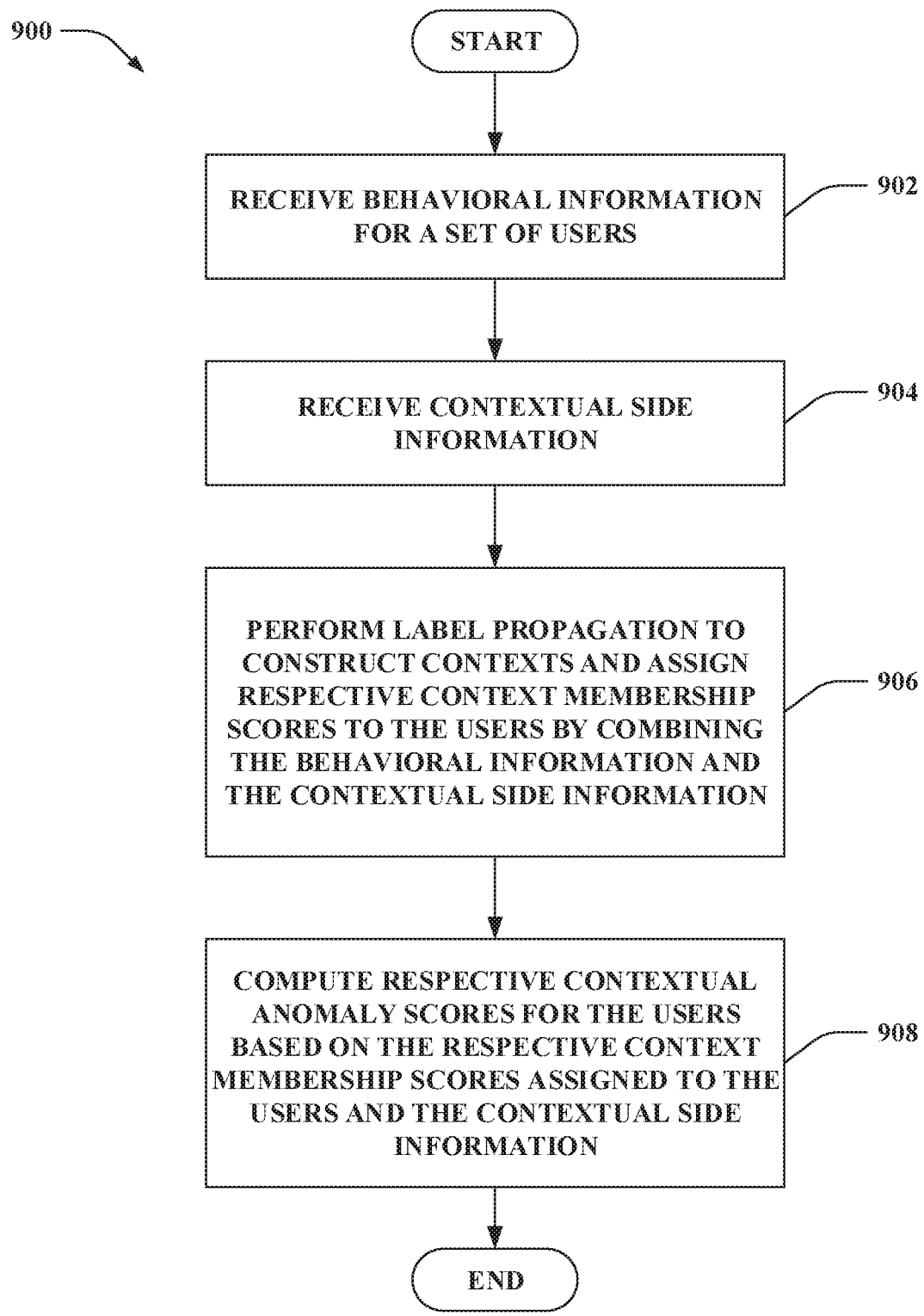
FIG. 9 is a flow diagram that illustrates an exemplary methodology of detecting contextual anomalies in a behavioral network.
Figure 10:
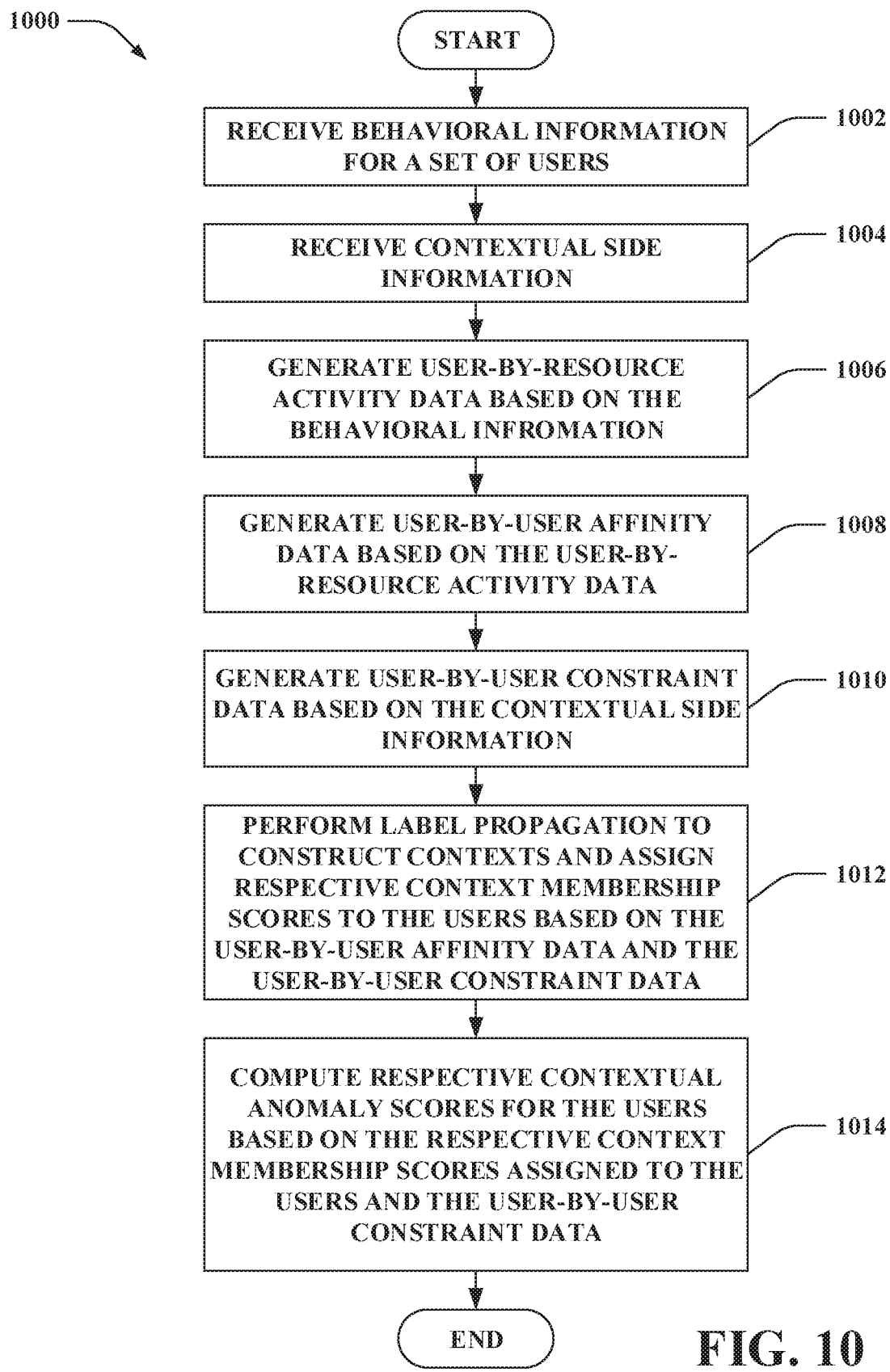
FIG. 10 is a flow diagram that illustrates an exemplary methodology of identifying contextual anomalies based on behavioral information and contextual side information.

FIGS. 9-10 illustrate exemplary methodologies relating to contextual anomaly detection. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 of detecting contextual anomalies in a behavioral network. At 902, behavioral information for a set of users can be received. The behavioral information can specify respective resource usages by the users within the behavioral network. At 904, contextual side information can be received. At 906, label propagation can be performed to construct contexts and assign respective context membership scores to the users. The contexts can be constructed and the context membership scores can be assigned by combining the behavioral information and the contextual side information during the label propagation. Moreover, each context can be a respective subset of the users expected to have similar resource usages.

At 908, respective contextual anomaly scores for the users can be computed based on the respective context membership scores assigned to the users and the contextual side information. The contextual anomalies can be detected from the contextual anomaly scores. For instance, the contextual anomalies can be detected as being associated with contextual anomaly scores above a threshold.

Turning to FIG. 10, illustrated is a methodology 1000 of identifying contextual anomalies based on behavioral information and contextual side information. At 1002, behavioral information for a set of users can be received. At 1004, contextual side information can be received. At 1006, user-by-resource activity data can be generated based on the behavioral information. The user-by-resource activity data can specify interactions between the set of users and a set of resources. At 1008, user-by-user affinity data can be generated based on the user-by-resource activity data. The user-by-user affinity data can specify similarities between the respective resource usages of the users.

At 1010, user-by-user constraint data can be generated based on the contextual side information. At 1012, label propagation can be performed to construct contexts and assign respective context membership scores to the users based on the user-by-user affinity data and the user-by-user constraint data. Each context can be a respective subset of the users expected to have similar resource usages. At 1014, respective contextual anomaly scores for the users can be computed based on the respective context membership scores assigned to the users and the user-by-user constraint data. Further, the contextual anomalies can be detected from the contextual anomaly scores.

According to an example, the contextual anomaly score for a given user can be a function of a deviation between the contextual membership score assigned to the given user and an expected contextual membership score for the given user. The expected contextual membership score for the given user can be based on the user-by-user constraint data and the respective contextual membership scores assigned to the other users in the set of users.

Figure 11:
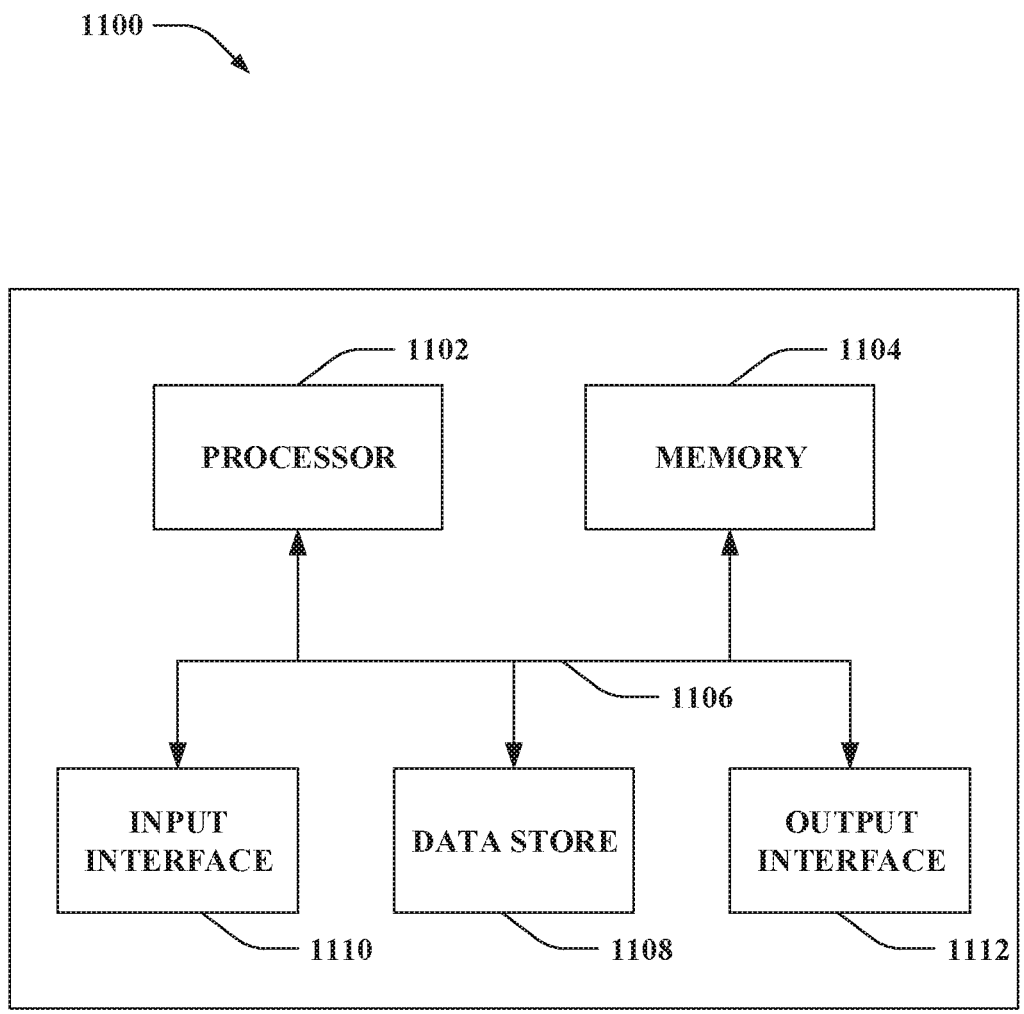
FIG. 11 illustrates an exemplary computing device.

Referring now to FIG. 11, a high-level illustration of an exemplary computing device 1100 that can be used in accordance with the systems and methodologies disclosed herein is illustrated. For instance, the computing device 1100 may be used in a system that detects contextual anomalies based upon behavioral information and contextual side information. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store behavioral information, contextual side information, user-by-resource activity data, user-by-user affinity data, user-by-user constraint data, context membership scores, contextual anomaly scores, and so forth.

The computing device 1100 additionally includes a data store 1108 that is accessible by the processor 1102 by way of the system bus 1106. The data store 1108 may include executable instructions, behavioral information, contextual side information, user-by-resource activity data, user-by-user affinity data, user-by-user constraint data, context membership scores, contextual anomaly scores, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of detecting security threats in a computing network, comprising:
    receiving behavioral information for users in the computing network over a time period, the behavioral information comprising identifies of the users and identifies of computing devices in the computing network respectively utilized by the users over the time period;
    generating a user-by-computing device activity matrix for the time period based on the behavioral information;
    generating a user-by-user affinity matrix for the time period based on the user-by-computing device activity matrix for the time period, the user-by-user affinity matrix for the time period comprising similarity measure values specifying similarities between respective usages of the computing devices by the users over the time period;

for the time period, constructing contexts and assigning respective context membership scores to the users by combining the user-by-user affinity matrix for the time period and a user-by-user constraint matrix representing users belonging to a common context, wherein the user-by-user constraint matrix comprises values encoding pairwise constraints associated with each context, the constraints being defined based on contextual side information;

detecting a security threat in the computing network for the time period based on the respective context membership scores assigned to the users; and outputting information specifying the security threat in the computing network for the time period.

2. The method of claim 1, wherein a context membership score for a particular context assigned to a given user is indicative of whether the given user belongs to the particular context.

3. The method of claim 1, further comprising:
receiving subsequent behavioral information for the users in the computing network over a subsequent time period, the subsequent time period being a next time period after the time period;
generating a user-by-computing device activity matrix for the subsequent time period based on the subsequent behavioral information;
for the subsequent time period, constructing updated contexts and assigning respective updated context membership scores to the users by combining the user-by-user affinity matrix for the subsequent time period and the user-by-user constraint matrix;
detecting a security threat in the computing network for the subsequent time period based on the respective updated context membership scores assigned to the users; and
outputting information specifying the security threat in the computing network for the subsequent time period.

4. The method of claim 1, wherein the user-by-user constraint matrix is altered for the time period relative to a prior time period.

5. The method of claim 1, wherein the detecting of the security threat in the computing network for the time period is further based on deviations between the respective context membership scores assigned to the users and the expected context membership scores for the users.

6. The method of claim 1, wherein the security threat comprises a preset number of most likely contextual anomalies for the time period.

7. The method of claim 1, wherein the security threat comprises one or more contextual anomalies above a threshold likelihood.

8. The method of claim 1, wherein each context is a respective subset of the users expected to have similar usages of the computing devices.

9. The method of claim 1, wherein the contexts are updated over time.

10. The method of claim 1, wherein the computing network to which the computing devices belong is a time-evolving heterogeneous network.

11. A system that detects a security threat in a computing network, comprising:
at least one processor; and
memory that comprises computer-executable instructions that, when executed by the at least one processor, cause the at least one processor to perform acts including:
generating a user-by-user affinity matrix for a time period based on behavioral information for users in the computing network over the time period, the behavioral information comprising identities of the users and identities of computing devices in the computing network respectively utilized by the users over the time period, the user-by-user affinity matrix for the time period comprising similarity measure values specifying similarities between respective usages of the computing devices by the users over the time period;

for the time period, constructing contexts and assigning respective context membership scores to the users by combining the user-by-user affinity matrix for the time period and a user-by-user constraint matrix, wherein the user-by-user constraint matrix comprises values encoding pairwise constraints associated with each context, the constraints being defined based on contextual side information;

detecting a security threat in the computing network for the time period based on the respective context membership scores assigned to the users; and causing information specifying the security threat in the computing network for the time period to be outputted.

12. The system of claim 11, the memory further comprises computer-executable instructions that, when executed by the at least one processor, cause the at least one processor to perform acts including:
generating a user-by-user affinity matrix for a subsequent time period based on subsequent behavioral information for the users in the computing network over the subsequent time period, the subsequent time period being a next time period after the time period;
for the subsequent time period, constructing updated contexts and assigning respective updated context membership scores to the users by combining the user-by-user affinity matrix for the subsequent time period and the user-by-user constraint matrix;
detecting a security threat in the computing network for the subsequent time period based on the respective updated context membership scores assigned to the users; and
outputting information specifying the security threat in the computing network for the subsequent time period.

13. The system of claim 11, wherein the detecting of the security threat in the computing network for the time period is further based on deviations between the respective context membership scores assigned to the users and expected context membership scores for the users.

14. The system of claim 11, wherein each context is a respective subset of the users expected to have similar usages of the computing devices, and the contexts are updated over time.

15. The system of claim 11, wherein the computing network to which the computing devices belong is a time-evolving heterogeneous network.

16. A non-transitory computer-readable storage device including computer-executable instructions that, when executed by at least one processor, cause the at least one processor to perform acts including:
generating a user-by-user computing device activity matrix for a time period based on behavioral information for users in a computing network over the time period, the behavioral information comprising identities of the users and identities of computing devices in the computing network respectively utilized by the users over the time period;
generating a user-by-user affinity matrix for the time period based on the user-by computing device activity matrix for the time period, the user-by-user affinity matrix for the time period comprising similarity measure values specifying similarities between respective usages of the computing devices by the users over the time period;

for the time period, constructing contexts and assigning respective context membership scores to the users by combining the user-by-user affinity matrix for the time period and a user-by-user constraint matrix, wherein the user-by-user constraint matrix comprises values encoding pairwise constraints associated with each context, the constraints being defined based on contextual side information;

detecting a security threat in the computing network for the time period based on the respective context membership scores assigned to the users; and causing information specifying the security threat in the computing network for the time period to be outputted.

17. The non-transitory computer-readable storage device of claim 16, further including computer-executable instructions that, when executed by the at least one processor, cause the at least one processor to perform acts including:

generating a user-by-computing device activity matrix for a subsequent time period based on subsequent behavioral information for the users in the computing network over the subsequent time period, the subsequent time period being a next time period after the time period;

generating a user-by-user affinity matrix for the subsequent time period based on the user-by-computing device activity matrix for the subsequent time period;

for the subsequent time period, constructing updated contexts and assigning respective updated context membership scores to the users by combining the user-by-user affinity matrix for the subsequent time period and the user-by-user constraint matrix;

detecting a security threat in the computing network for the subsequent time period based on the respective updated context membership scores assigned to the users; and outputting information specifying the security threat in the computing network for the subsequent time period.

18. The method of claim 1, wherein a subset of the users utilize a computing device in the computing devices, wherein the security threat comprises a user in the subset of users utilizing the computing device in a manner that is anomalous with respect to a context assigned to the user.

19. The system of claim 11, wherein a subset of the users utilize a computing device in the computing devices, wherein the security threat comprises a user in the subset of users utilizing the computing device in a manner that is anomalous with respect to a context assigned to the user.

20. The system of claim 11, the memory further comprises computer-executable instructions that, when executed by the at least one processor, cause the at least one processor to perform acts including:

generating a user-by-computing device activity matrix for the time period based on the behavioral information for the users in the computing network over the time period;

wherein the user-by-user affinity matrix for the time period is generated based on the user-by-computing device activity matrix for the time period.

* * * * *